Aug. 5, 1958
D. G. LA RUE
2,846,263
VEHICLE
Filed July 8, 1955
4 Sheets-Sheet 2
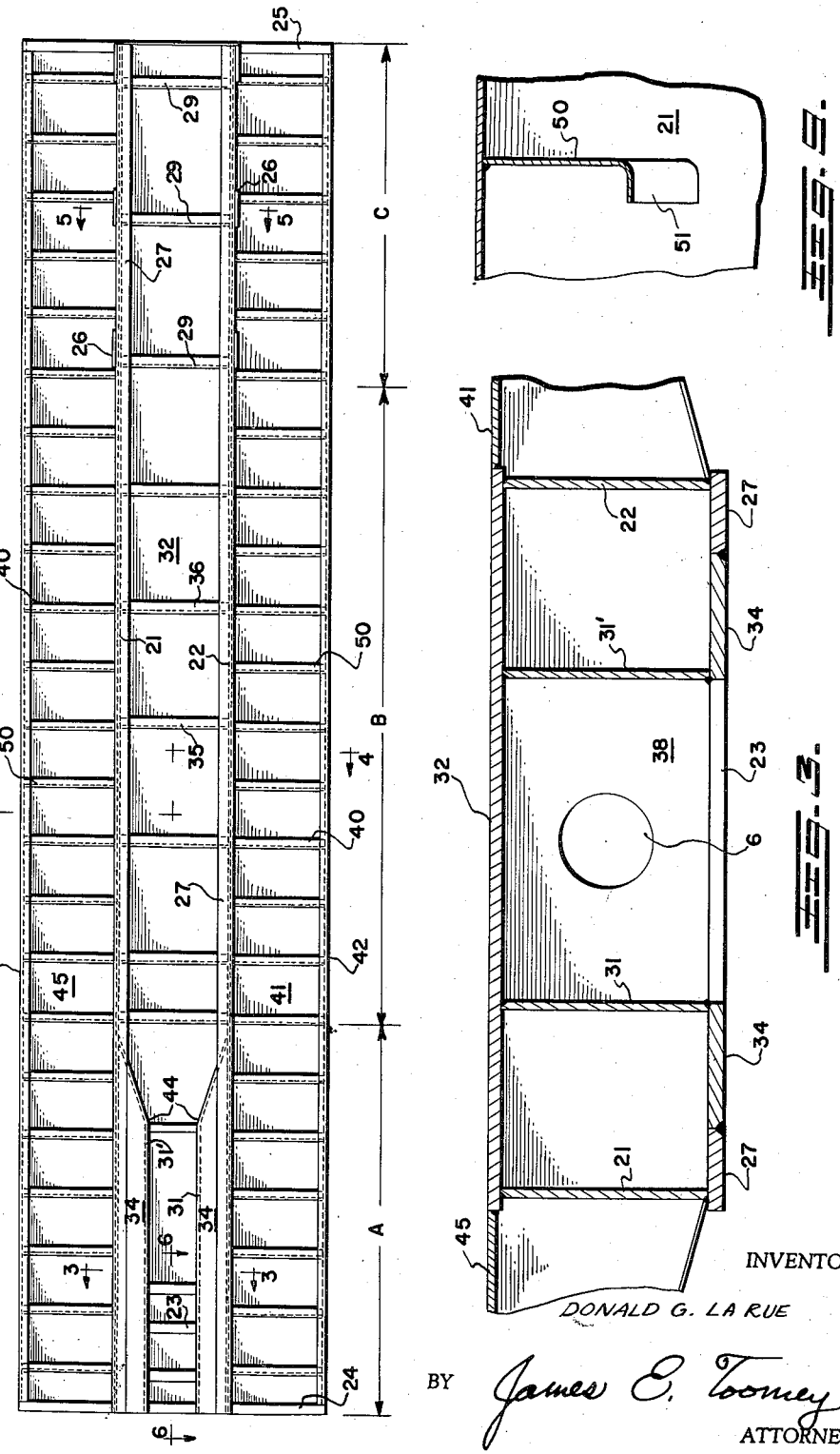
INVENTOR
DONALD G. LA RUE
BY James E. Toomey
ATTORNEY

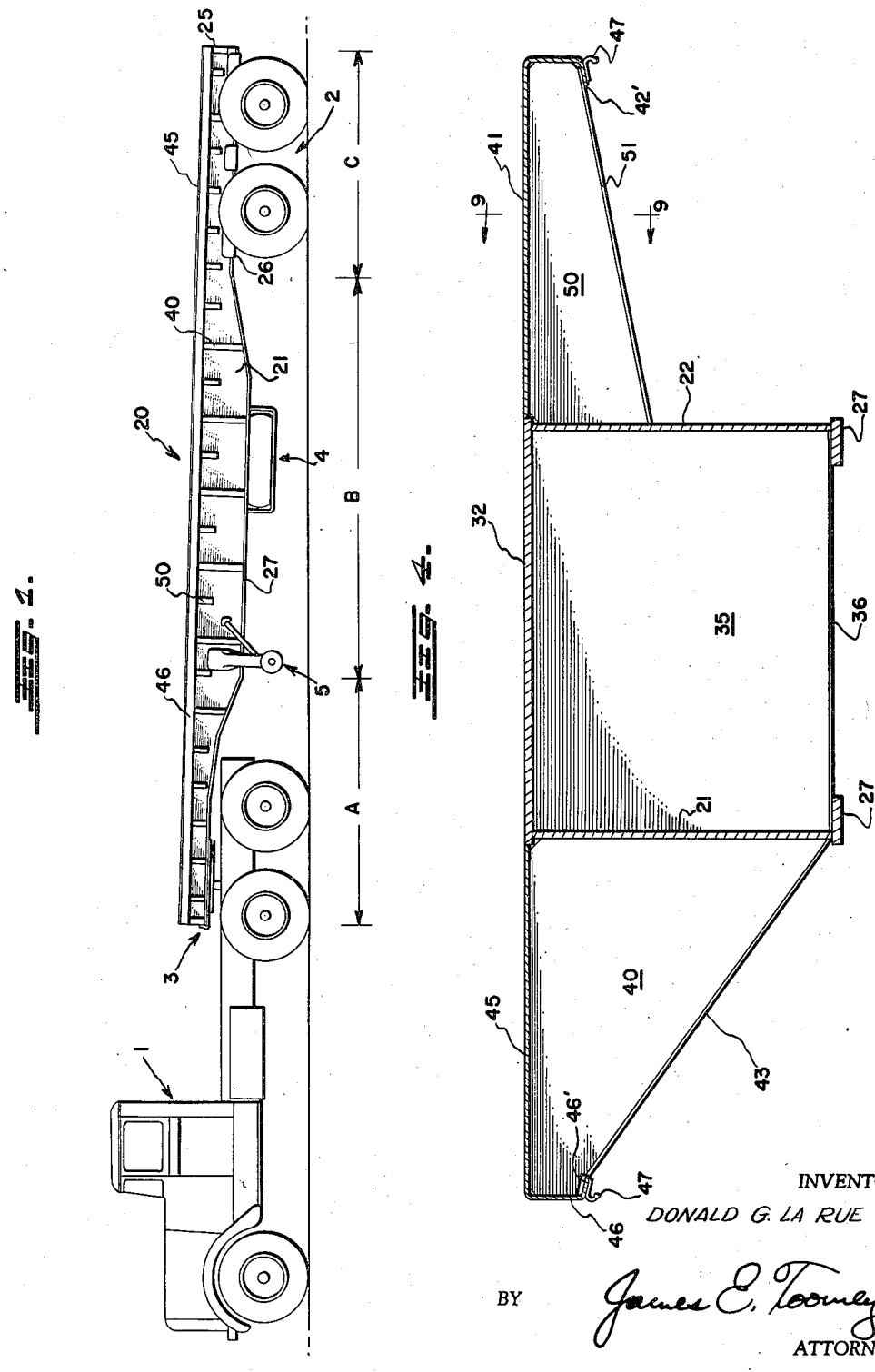

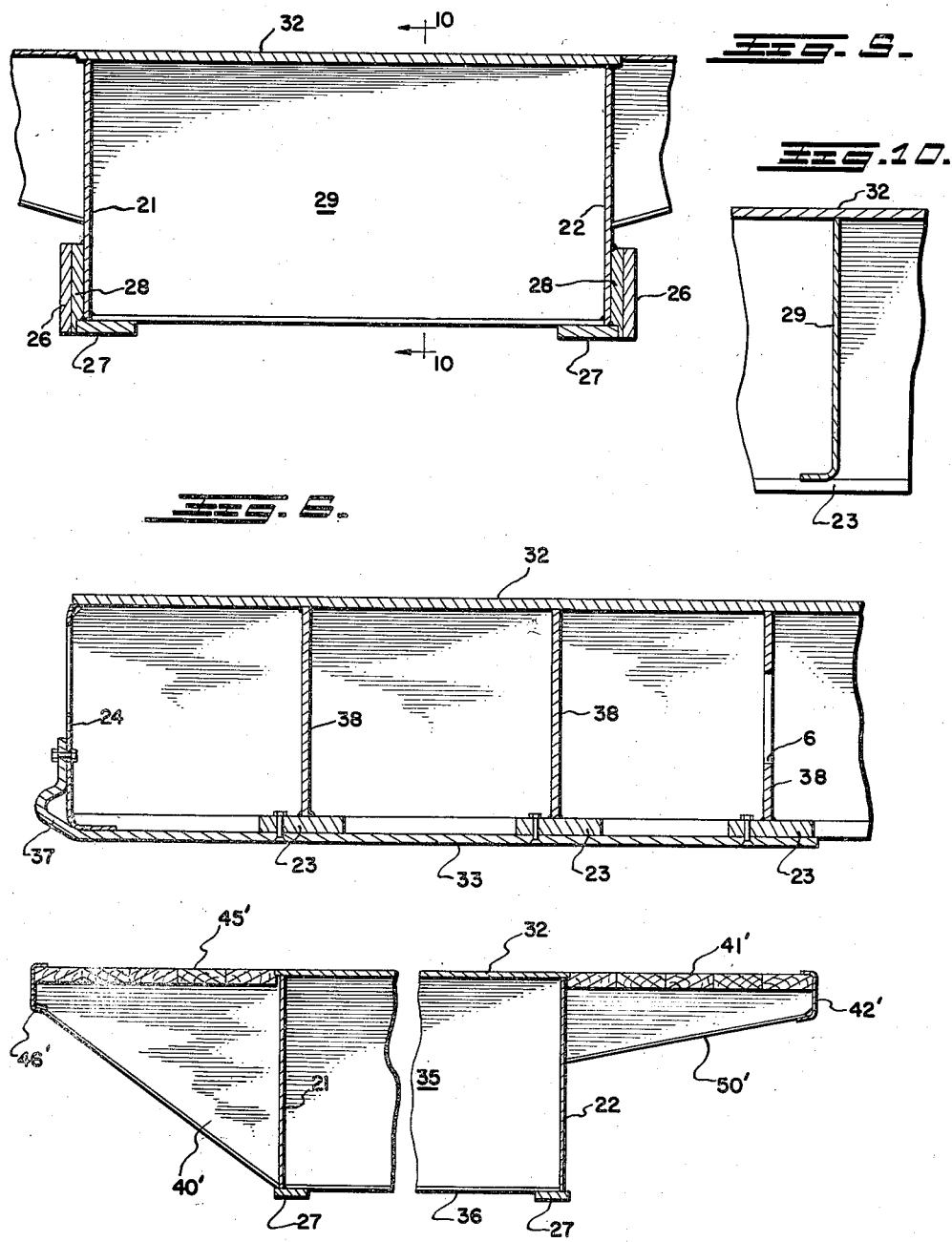

Aug. 5, 1958  D. G. LA RUE  2,846,263
VEHICLE
Filed July 8, 1955  4 Sheets-Sheet 4
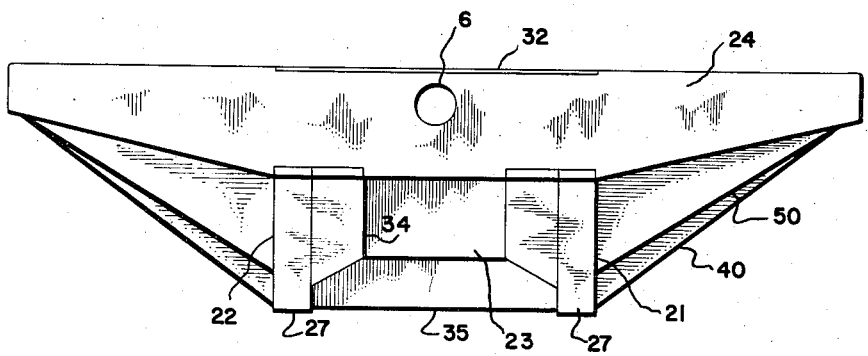
_FIG. 7._
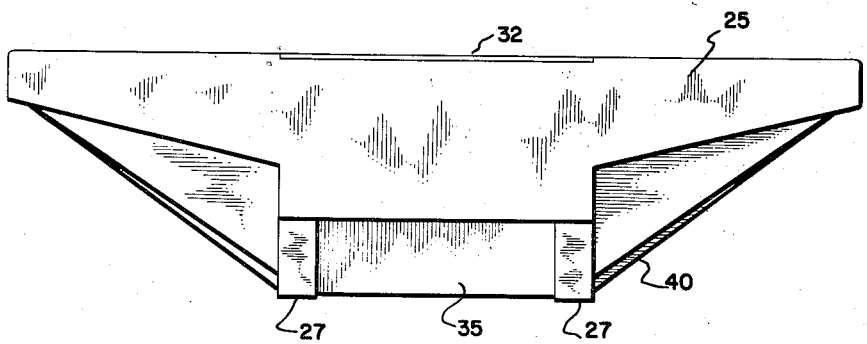
_FIG. 8._
INVENTOR
DONALD G. LA RUE
BY James E. Toomey
ATTORNEY

# United States Patent Office 2,846,263
Patented Aug. 5, 1958

2,846,263
VEHICLE

Donald G. La Rue, Orinda, Calif., assignor to Kaiser Aluminum & Chemical Corporation, Oakland, Calif., a corporation of Delaware Application July 8, 1955, Serial No. 520,719

9 Claims. (Cl. 296—28)

This invention relates to the construction of cargo carrying vehicles. More specifically, the invention is concerned with providing a novel cargo carrying vehicle of the type wherein an unobstructed and flat floor surface is provided for supporting the cargo being transported.

It is an object of the invention to produce a cargo carrying vehicle wherein a flat unobstructed floor is provided for the support of the cargo and wherein the floor serves as an integral part of the supporting framework or chassis of the vehicle.

A further object of the invention is to provide a flat bed type of cargo vehicle wherein the construction of the floor and chassis are such that the parts thereof may be made of light metals such as aluminum or magnesium without any sacrifice in the load bearing properties of the floor and chassis.

Still another object of the invention is to provide a cargo carrying vehicle which incorporates novel construction features such that they effect an unusually clean and uncluttered appearing vehicle in contra-distinction to the usual cargo carrying vehicle presently in use.

Still a further object of the invention is to produce a novel flat bed type of cargo carrying vehicle wherein the specific construction incorporates standard structural components easily fabricated and readily replaceable, all of which combine to effect substantial economy in the manufacture and maintenance of the vehicle.

Still another object of the invention is to produce a cargo carrying vehicle, having a flat, substantially level floor area, wherein adequate clearance is provided for the turning of the wheel units such as for example, a pivoted truck assembly, a pivotally connected tractor unit or the like.

These and additional objects will be apparent from the following description of the vehicle.

One of the primary concerns of those engaged in the transport of cargo today is the fact that while vehicle power and prime mover availabilities have become more flexible and advanced in recent years, the maximum load moving or carrying ability of such prime movers or vehicles still remains restricted because of the dead weight imposed thereon by body and chassis designs which have been relatively unchanged over the years. In road vehicles attempts to make use of such advances by larger vehicles and larger loads have resulted in considerable agitation and legislation affecting the maximum wheel loadings which may be produced by a truck or transport rig of a given length on the highways of the several States. Thus it will be readily appreciated that such load limits as may be imposed by law of necessity cut down on the pay load capacity of the vehicle in direct proportion to the amount of the dead weight that must be carried by the vehicle due to body and chassis designs.

Similar difficulties are being experienced in other forms of vehicles which rely on a detachable prime mover for power. For example, in railroading the output of locomotives has increased in recent years and such increases have been accompanied by an increase in speed and train lengths as well as car loading resulting in increased maintenance problems resulting from the ever increasing pounding absorbed by the rails and roadbeds.

In overcoming these and other problems apparent to those skilled in the art, the instant invention is directed to the construction of cargo carrying types of vehicles, wherein a minimum number of parts is required to fabricate the vehicle and wherein the construction is particularly adapted to enable the use of light metals such as aluminum with the attendant reductions in dead weight and resultant advantages accruing therefrom.

Further, the construction presented herein has numerous other advantages over the presently existing types of vehicles in that the construction components are formed of readily available extruded and plate elements. These are so fabricated as to present a clean appearance and an unobstructed floor surface, which in turn permits the maximum use of the cargo supporting surfaces.

Referring particularly now to the appended drawings and specific description of the vehicle to follow, it is to be noted that while the vehicle described comprises what is known in the transportation field as a flatbed, semi-trailer, the construction to be disclosed and claimed may be advantageously used in semi-trailers of stake or closed body design conventionally referred to as a "box" or van trailer. It may also be used in trailer vehicles completely self-supporting in and of themselves and even more broadly in any type of vehicle wherein the source of motive power is a detachable prime mover.

By way of example, specific reference is made to the atached drawings wherein:

Figure 1 is a side elevational view of a flatbed semi-trailer incorporating the construction features of the instant invention.

Figure 2 is a bottom plan view of the semi-trailer as shown in Figure 1, certain parts thereof being shown in dotted lines.

Figure 3 is a sectional view along the line 3—3 of Figure 2 with certain parts thereof broken away along the lines indicated.

Figure 4 is a sectional view taken along the line 4—4 of Figure 2 disclosing the construction of the central beam member at the deepest web portion thereof.

Figure 5 is a partial sectional view taken along the line 5—5 of Figure 2 and having certain parts thereof broken away as indicated.

Figure 6 is an elevational sectional view taken along the line 6—6 of Figure 2 and disclosing the specific construction incorporated in a semi-trailer at the point of attachment of the conventional fifth wheel structure.

Figure 7 is a front elevational view of the instant invention.

Figure 8 is a rear elevational view of the construction of the instant invention.

Figure 9 is a sectional view taken along the line 9—9 of Figure 4 and discloses the details of a typical outrigger section.

Figure 10 is a sectional view of one of the cross members incorporated in the instant construction as taken along the line 10—10 of Figure 5; and Figure 11 is a view similar to Figure 4 except that it discloses an alternative type of floor assembly including certain wooden portions.

With respect to the detailed figures, it is to be noted that certain of the figures have been enlarged for the purposes of clarification.

As may be seen from an inspection of Figure 1, the semitrailer of the instant invention is attached to and towed by the conventional tractor 1 having a suitably mounted fifth wheel structure designated generally at 3.

The trailer 20 is supported on the fifth wheel structure at its front end and at its rear end on a tandem axle suspension assembly 2 of conventional design. As is also conventional in the art, a landing gear structure 5 is attached to the semi-trailer forwardly of the midpoint thereof and is used to support the front end portion at such time as the prime mover 1 may be detached at 3 from its towing relation with respect to the semi-trailer 20.

The usual spare wheel rack 4 may be attached by any suitable means to the underside of the semi-trailer 20 and as is conventional carries a single or plurality of spare wheels and tires for emergency use.

It is believed well to point out at this time that the fifth wheel structure may be of any conventional design as well as the landing gear structure and the tandem wheel assembly 5 and 2 respectively, these elements forming actually no part of the instant invention.

Having in mind the specific disclosures of Figures 1 and 2, it may be seen that the trailer 20 incorporates a construction wherein a plurality of drop center web members 21 and 22 are disposed in parallel relation and symmetrically arranged with respect to the longitudinal center line of the vehicle. These web members 21 and 22 are inter-connected at their upper edges by a flat plate 32 which extends from the forward cross member 24 the entire length of the vehicle structure to the rear cross member 25. Thus, the plate member 32 in conjunction with the vertically disposed web members 21 and 22 forms an inverted channel member with the flanges of the channel facing vertically downwardly. The connecting web 32 is disposed horizontally, forming in addition to a structural member a continuous uninterrupted center floor surface extending for the entire length of the vehicle. The downwardly disposed central beam members 21 and 22 have extruded, longitudinally extending, rectangular sectioned members 27 welded or otherwise suitably fastened to their lowermost edges. These members 27 as shown clearly in Figure 4, are so arranged as to constitute a lower flange member for the members 21 and 22 and extend from the rearmost edge of the trailer at cross member 25 continuously forwardly to the frontmost portion where the web members 21 and 22 are attached to the front cross member 24.

Parallel, symmetrically arranged web members 21 and 22 are also reinforced and held in proper relation with respect to each other by means of a series of plate members 35 which, as may been seen from an inspection of Figure 11, are vertically disposed and of a depth equal to the depth of webs 21 and 22 along which they are positioned. These plate members 35 have perpendicular flange members 36 formed integrally along their bottom edges and disposed in the horizontal plane parallel to the floor member 32. There are shown six of these reinforcing members although it would be appreciated that any suitable number thereof may be utilized.

Thus, it may be seen that the symmetrically arranged drop center members 21 and 22 in conjunction with members 35, the flooring member 32 and including the extruded members 27 may be described as a central backbone structure extending longitudinally of the vehicle and serving to receive all forces and reactions which may be produced by reason of the load carried by the vehicle. The particular construction disclosed eliminates any necessity for a separate underframe structure supporting a separately constructed and distinct floor structure as is conventional in the art. In the instant construction, the floor member 32 serves not only to support a load and present an unobstructed surface for the maneuvering of the load, whatever it may be, but also is an integral part of the structure of the frame.

Thus, all bending, shear, torque and impact loads which may be imposed on the vehicle by reason of its operation in transporting load will be carried through the backbone structure formed by the elements described above and transmitted to the reaction points in the particular illustration formed by the fifth wheel connection to the tractor at the foremost end and the connection of the tandem axle assembly at the rearmost end.

As may be seen from inspection of Figure 5, a series of mounting pad members 26 and fillet plates 28 are suitably located on the sides of the vertical beam members 21 and 22 and welded to the lower extruded members 27 at the rearmost portion of the trailer to enable attachment of a conventional tandem axle and wheel suspension means. These pads may be relocated as is dictated by the type of suspension means to be used and if desired the illustrative semi-trailer could be provided with a conventional single axle and wheel assembly.

Referring now in particular to the disclosures of Figures 3 and 6, it is to be noted that the foremost portion of the vehicle structure is reinforced in such a manner as to provide adequate strength for the longitudinal forces as well as the torque and vertical forces which will be imposed thereon by reason of its connection in the illustrative drawing to a fifth wheel incorporated on the back of a usual tractor 1. As is evident from an inspection of the drawings, the forward portion of the trailer, and reference is made to Figure 1, includes a relatively shallow beam portion kicked up from the point of maximum depth as indicated by the longitudinal distance A to provide adequate clearance for turning of tractor 1, while maintaining the cargo carrying area level with respect to the ground surface. This forward portion is heavily reinforced as indicated in Figures 3 and 6 and the reinforcement takes the form of a pair of vertical disposed plate members 31, 31' symmetrically arranged about the longitudinal axis of the trailer and disposed in parallel relation inwardly of the longitudinally extending vertical web members 21 and 22. These plate members are of equal vertical dimension to the kicked-up position A of the members 21 and 22. The topmost edge of the plates are welded to the lowermost face of the floor element 32 and extend longitudinally of the vehicle as illustrated in Figure 2 to the point 44 at which the maximum depth of the vertically disposed web members 21 and 22 is reached, at which time the plates are bent outwardly and diverge so as to contact and make a welded connection with the members 21 and 22. Thus, the plate members are interconnected with the web members 21 and 22 by means of the top member 32 and are connected at their lowermost edges with the longitudinally extending extrusion members 27 by means of extension plate members 34. The described construction thus comprises a pair of parallel, longitudinally disposed box beam members formed by portions of the element 32, portions of the vertical webs 21 and 22, the plates 31 and 31', the extrusion members 27 and the additional horizontally disposed plate extensions 34.

This construction is further strengthened by means of transversely disposed rectangular plate sections 38, certain of which will be provided with access holes 6. As may be seen from an inspection of Figure 6, the plate members 38 are shown welded to the top floor section 32 and have a series of transversely extending rectangular sectioned members 23 welded to their lowermost edge. These members 23 serve to form in effect a flange structure in which the plates 38 and that portion of the top floor section 32 adjacent the plates can be considered as forming transverse I-beams reinforcing the vertical web members 21 and 22 at the point of interconnection of the fifth wheel assembly with the towing vehicle. Suitable access openings 6 may be provided in plates 38 as well as in member 24 as desired. These access openings are provided so as to enable the fastening of the fifth wheel element 33, as shown in Figure 6, to the central channel structure. It is to be noted that the fifth wheel element is generally steel and hence other fastening means than welding may be required.

Further, at the rearmost end of the trailer, vertical web portions 21 and 22 again include a kicked-up section C to which the mounting pads for the tandem wheel suspension assembly as described above, are attached. Referring to Figure 5, it may be seen that this section of the beams or of web members 21 and 22 is reinforced by the inclusion of plate members 29 and these plate members 29 as illustrated in Figure 10 take the form of a vertically disposed portion having an outwardly and forwardly turned flange of relatively short extent as compared with the depth of the vertical portion. Thus, it may be seen that suitable reinforcement is provided at the rearmost portion of the load carrying vehicle to adequately absorb vertical and torque loads which may be imposed on the backbone structure by reason of the connection of the suspension element thereto. Thus, it may be seen that as described the backbone structure in and of itself constitutes a complete semi-trailer assembly which is self-supporting and capable of supporting a load on its uppermost surfaces as designated by numeral 32.

In order to enhance the construction by extending the width of the trailer to the permissible maximum legal limit, a series of outrigger members designated as members 40 and 50 and illustrated clearly in Figure 4 of the drawings are attached to the central supporting structure much in the manner of a rib connection to a backbone.

These outriggers take the form of plate-like members having a generally triangular plan configuration, the hypotenuse of the triangle including perpendicular flanges 43 and 51. As may be seen from an inspection of Figure 4, two such outrigger elements 40 and 50 are incorporated in the instant invention, one 40 being of a considerably greater depth than the other 50. The outriggers 40 are connected along the entire face of the deep portion of the central web members 21 and 22. The other outriggers 50 are of relatively shallow depth and resemble in plan another triangle, the hypotenuse of which also includes a perpendicular flange 51 and these outriggers 50 are attached to the uppermost floor member 32 and along the web portion 21 of the central members to a point approximately midway of the maximum depth of the web members. Thus, the resulting structure would assume the form of a central backbone or channel as has been stated hereinbefore with a series of longitudinally spaced, triangularly shaped outrigger members projecting laterally to either side of the web members 21 and 22, certain of the outriggers extending to the lowermost portion of the central webs 21 and 22 and certain other of these outriggers members extending only partially downwardly with respect to the floor 32 and attached along a base to the approximate midpoint of the vertically disposed portions for sections 21 and 22.

As is evident from an inspection of Figure 1, the outrigger members are all of the shallow type at the front kicked-up portions A of the main channel structure and are alternately of deep and shallow type along the deepest portion B of the members 21 and 22 with the shallow formation again being incorporated at that portion of the rearmost kick-up C overlying the tandem wheel of assembly.

Referring again to Figure 4, the members 40 and 50 in turn support a pair of plate elements 41 and 45, member 41 being of right-hand configuration and the member 45 being of left-hand configuration and these elements 41, 45 are disposed symmetrically of the longitudinal center line of the trailer and are employed identically on either side of the longitudinal channel section 32. These members 41, 45 are plate-like members which extend longitudinally of the trailer from the foremost portion 24 to the rearmost portion 25 and are generally L-shaped with the shorter leg of the L disposed in a vertical position and forming rub rails or bumpers at the outer marginal ends of the trailer as clearly shown in Figure 4, these legs being designated by the numerals 42, 46. As is also disclosed in the figure, a series of hook members or tie down members 47 may be connected to the lowermost portion of the leg which included turned-in flanges indicated as 42' and 46'. These are used to lash the cargo to the floor.

Thus, it may be said that the floor extensions 41, 45 along with the rib elements 40 and 50 are in effect cantilever floor sections extending to either side of the central backbone structure and serve to increase the width of the vehicle, presenting along with the topmost flange portion 32 of the central channel construction an unobstructed floor extending the entire width and length of the particular embodiment of the invention disclosed.

Referring specifically to Figure 11 of the drawing it is apparent that an additional arrangement of floor structure is within the contemplation of the instant invention. This alternative floor structure incorporates the identical construction described above with regard to the central inverted channel or backbone structure and differs therefrom only in the fact that the plate-like members constituting the floor section supported by the outriggers 40 and 50 is replaced by wooden flooring and separate sill members.

It is believed well to point out that in certain instances cargo will be carried by the vehicle which would require the use of some securing means other than that which may be effected through the of the hook members disclosed. To facilitate the tie down of such cargo, the alternative type of floor structure would incorporate wooden flooring supported by outriggers 40' and 50' to either side of the central floor member 32 in such a manner that spikes, bolts or the like may be inserted into the wooden flooring to securely fasten such cargo with respect to the floor structure.

The central inverted channel or backbone structure of the trailer is identical with that utilized in the construction described previously wherein the entire cargo supporting floor surface is composed of a light metal. The changes by which a wooden flooring may be incorporated in the construction comprise basically the formation of outrigger members 40' and 50' in such a manner that the upper surface or the horizontal side of the triangle formed by these members is disposed a slight distance below the level of the floor member 32. A suitable wooden flooring member 41' and 45', respectively, are laid in horizontal relation on the top of the outrigger members 40' and 50' in such a manner that the upper surfaces are in a common plane with the upper surface of floor member 32. These wooden members may be formed of planking or an integral wooden beam, either of which is common in the art, and may be bolted or otherwise suitably fastened to the outriggers 40', 50'. Separate and distinct rail members 42' and 46' are used to cap the peripheral edges of the flooring members 41', 45' and these rail members may be welded to the edges of the outrigger members 40', 50' as is clearly indicated. These cap members 42', 46' are in effect channel members in which one leg of the channel is at a slight angle to the web and in which the edge of the floor members 41', 45' are received within the upper leg of the channel as clearly shown in the drawing. Of course, it is within the contemplation of the instant arrangement that the floor members 41', 45' may be inserted beneath a lip formed by projecting the member 32 a slight degree beyond the outermost surfaces of the web members 21, 22. In this latter case, the sole fastening means for the floor would constitute the innermost channel-like recess receiving the innermost edge of the floor and the outermost channel-like recess formed by the respective sill members 42', 46'.

It is to be noted in all cases that the central floor member 32 in effect constitutes approximately ⅓ of the lateral extent of the floor surface and that the floor sections supported by th outriggers 40, 50 or 40', 50', respectively, complete the floor structure thus amounting to approximately ⅔ of the total extent of the floor area.

In the use of the wooden floor sections it is apparent then that suitable strap members or other fastening means may be spiked or bolted to the wooden floor to prevent shifting of the cargo due to the motion of the vehicle and the application of such an arrangement is to be favored when the use of the vehicle is to be such that hook members 47 as shown in Fig. 4 would not provide adequate fastening means to prevent the shifting of the cargo.

It is to be noted that the construction incorporates no fastening means other than welding substantially throughout its entire construction. The only separable fastening means provided are as shown in Figure 6 wherein the plate-like fifth wheel member 33 including the forward rub or bumper rail 37 is attached to the horizontal extruded members 23. Thus, the instant invention provides a flatbed semi-trailer or other flat floor-type vehicle wherein the construction is extremely light, thus reducing the dead weight and, accordingly, increasing the pay load which may be carried thereon without exceeding state law wheel loading limits. Also, the instant construction results in a vehicle which may be readily repaired in the event of damage and in which conventional components of readily fabricated design are used.

Aside from the structural advantages effected, it is to be noted that when a light metal such as aluminum is used in the construction the appearance of the entire assembly is not only extremely clean with a minimum of projecting parts but is more pleasing in appearance than the appearance obtained with the conventional construction method. It is also evident that no separate frame structure is incorporated, the floor structure and the structural components in effect being a welded integral unit, a fact which contributes materially, not only to the overall strength but also to the weight savings produced by the instant invention.

Accordingly, while disclosed in the instant specification as a motor vehicle, the use of the teachings incorporated in the instant invention are limited only by the scope of the appended claims.

What is claimed is:

1. In a vehicle having a flat, unobstructed cargo carrying surface a unitary frame and floor structure comprising a central, longitudinal inverted channel assembly including a horizontal floor section and downwardly disposed parallel web portions, cantilever floor sections connected to and supported by the central longitudinal channel structure, said cantilever sections including an elongated flat floor disposed in the same horizontal plane as and to either side of said first mentioned floor section and further including perpendicular downwardly formed integral rail portions, supporting outrigger members connected to said vertically disposed web portions of said central channel structure, said central elongated, inverted channel sections and said elongated flat cantilever floor sections extending the full length of the vehicle.

2. A vehicle as described in claim 1 wherein the frame and floor structure comprises a chassis-less, all-welded unitary frame construction.

3. A vehicle as described in claim 1 wherein said elongated flat floor carried by said supporting outrigger members is comprised of wooden, fastener penetratable planks.

4. In a vehicle having a flat, unobstructed cargo carrying surface a unitary frame and floor structure comprising a central elongated beam structure including a floor section, said central elongated beam structure also including vertically positioned parallel web portions, having kicked-up end portions, cantilever floor sections connected to and supported by the central elongated beam structure, said cantilever sections having elongated flat floor elements disposed in the same horizontal plane as and to either side of said first-mentioned floor section and perpendicularly downwardly formed sill portions and supporting outrigger members connected to said web portions of said central elongated beam structure, said central elongated beam structure and said elongated flat cantilever floor sections extending the full length of the vehicle, and the kicked-up end portions of the central beam structure being provided with selected wheel suspension means.

5. The claim as defined in claim 4 wherein the vehicle comprises a chassis-less all-welded unitary frame construction.

6. A vehicle frame as described in claim 4 wherein one of said kicked-up end portions of said central elongated beam structure includes further spaced parallel symmetrically arranged web portions, said second-mentioned web portions and said forward portions of the central elongated beam structure comprising two parallel box beam members, and wheeled support mounting means provided on said box beam members.

7. In a vehicle having a flat, unobstructed cargo carrying surface a unitary all-welded frame and floor structure comprising a central elongated beam structure having a horizontal floor section and vertically disposed symmetrically arranged web portions, cantilever floor sections connected at either side to and supported by the central elongated beam structure and including outrigger supports connected to and supported by said web portions of said central elongated beam structure, brace means extending transversely of the vehicle within said central elongated beam structure and rigidifying said central elongated beam structure, said central elongated beam structure forming a primary, rigid, unitary chassis-less load transmitting assembly, said cantilever floor sections transmitting stress thereto, said central elongated beam structure and said cantilever floor sections extending the full length of the vehicle.

8. A vehicle having a flat, unobstructed cargo carrying surface including a floor structure comprising a central, load transmitting elongated beam structure including a floor section and vertically disposed symmetrically arranged web portions, cantilever floor sections connected at either side to and supported by the central elongated beam structure and including outrigger supports connected to and supported by the web portions of said central elongated beam structure, brace means extending transversely of the vehicle and interconnecting said central elongated beam structure, said elongated beam structure forming a rigid chassis-less unitary load transmitting assembly, said cantilever floor section and said central elongated beam structure extending the full length of the vehicle, the cantilever floor sections further including a wooden load supporting surface.

9. A device as described in claim 8, wherein said cantilever floor sections are provided with external, marginally defining channel members.

References Cited in the file of this patent

UNITED STATES PATENTS

| 1,400,345 | Brile | Dec. 13, 1921 |
| 2,235,136 | Barrett | Mar. 18, 1941 |
| 2,346,130 | Evans | Apr. 11, 1944 |

FOREIGN PATENTS

| 12,941 of 1915 | Great Britain | July 27, 1916 |
| 296,445 | Great Britain | Nov. 15, 1928 |
| 491,966 | Great Britain | Sept. 12, 1936 |
| 612,286 | Great Britain | Nov. 10, 1948 |
| 616,274 | Great Britain | Jan. 19, 1949 |

UNITED STATES PATENT OFFICE
CERTIFICATE OF CORRECTION

Patent No. 2,846,263                                                         August 5, 1958

Donald G. La Rue

It is hereby certified that error appears in the printed specification of the above numbered patent requiring correction and that the said Letters Patent should read as corrected below.

Column 2, line 32, for "atached" read -- attached --; column 3, line 48, for "been" read -- be --; column 6, line 25, after "the", first occurrene insert -- use --; line 36, for "composed" read -- comprised --; line 73, for "th" read -- the --.

Signed and sealed this 21st day of April 1959.

(SEAL)
Attest:

KARL H. AXLINE                                        ROBERT C. WATSON
Attesting Officer                                     Commissioner of Patents